(No Model.)
W. S. NEWTH.
REEL DEVICE FOR FENCE WIRE.
No. 330,610. Patented Nov. 17, 1885.
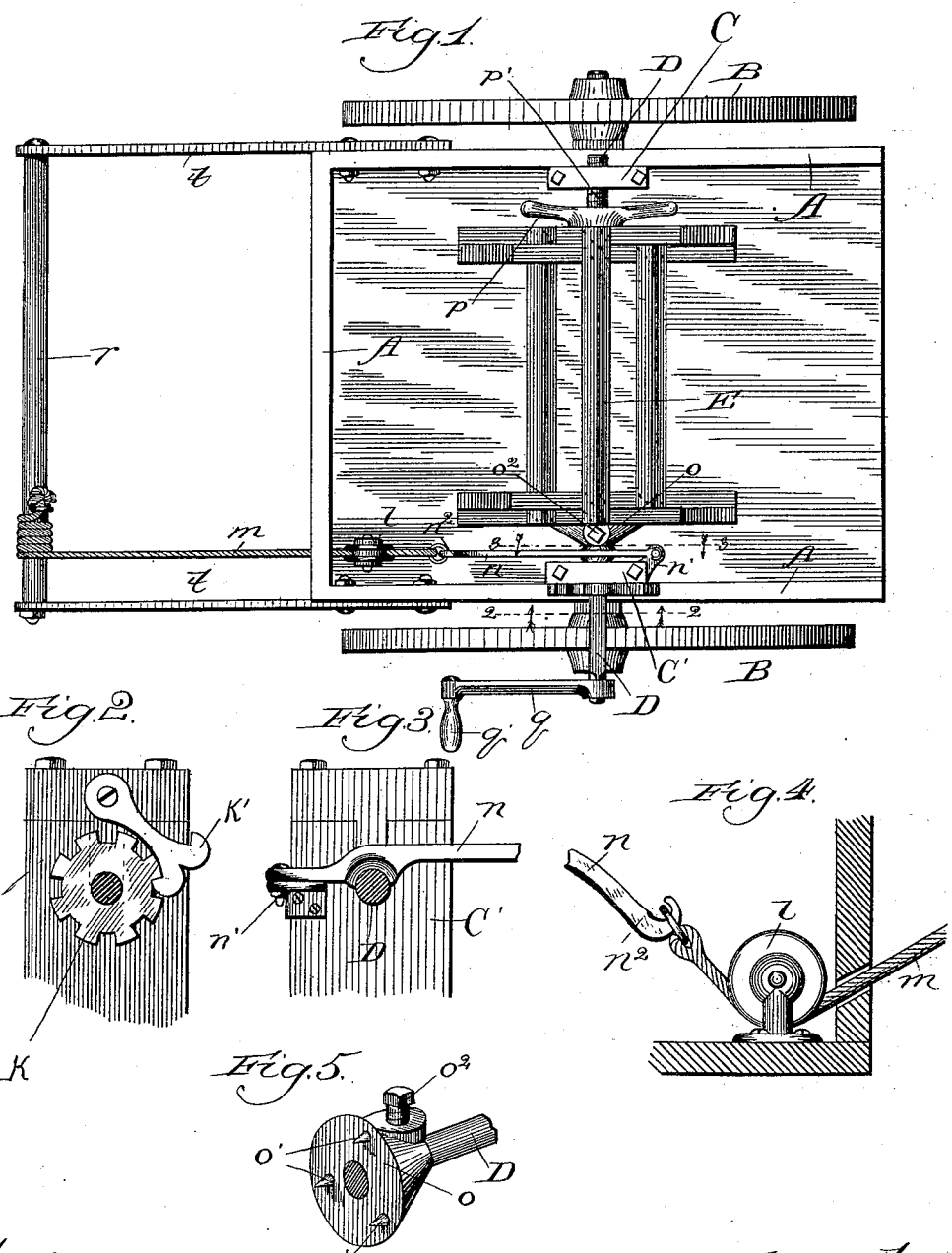

UNITED STATES PATENT OFFICE.

WALTER S. NEWTH, OF DE KALB, ILLINOIS, ASSIGNOR OF ONE-HALF TO
R. H. ROBERTS, OF SAME PLACE.

REEL DEVICE FOR FENCE-WIRE.

SPECIFICATION forming part of Letters Patent No. 330,610, dated November 17, 1885.

Application filed May 26, 1885. Serial No. 166,693. (No model.)

*To all whom it may concern:*

Be it known that I, WALTER S. NEWTH, a citizen of the United States, residing at De Kalb, in the county of De Kalb and State of Illinois, have invented a certain new and useful Reel Device for Fence-Wires; and I hereby declare the following to be a full, clear, and exact description of the same.

It frequently happens in agricultural pursuits, and more especially since the widespread introduction of barbed wire for fencing purposes, whereby the desire is more readily carried into effect, that farmers wish temporarily to separate one portion of a field from another, or to divide adjoining fields for a part of the season only—as, for instance, when it is desired to "break" and cultivate a portion of pasture-land, or part of a grain-field is reserved for pasture. In these cases, and in many more which might be mentioned, a temporary fence is necessary to prevent cattle and other live stock pastured in one part of the field from entering upon and destroying the growing crops; and since barbed wire affords the most convenient and simple method of fence-building in this connection, it is commonly used for the purpose. When, however, the close of the season may render it desirable that the fields or parts of them shall be cleared of all obstructions, a very great obstacle has been met in use of barbed wire for purposes of temporary fencing in the difficulty of its disposal, and the cost of providing specially-constructed reels for gathering it. It is not easy, also, for the operator to come into personal contact with the barbed wire in the difficult operation of winding the same without danger of receiving injury from its sharp points.

It is my object to provide a device, simple and inexpensive in its construction and effective in its operation, by means of which shall be readily gathered the barbed wire used temporarily for fencing purposes, obviating thereby the necessity for personal contact of the hands of the operator with the barbed wire, and providing for the use, in recoiling the wire from its place in temporary fences, of the original wooden spools on which barbed wire is coiled for transportation and sold by the manufacturer.

It is further my object to afford a device which, in addition to the aforesaid ends, shall serve as a wire-fence stringer by unwinding from the spool as the device is drawn along the desired supply of wire, and which shall permit, by suitable means provided for the purpose, perfect control of the paying out of the wire in building the fence.

To these ends my invention consists in a wheeled vehicle having mounted upon it independent of the wheels a rotary shaft carrying, and detachably secured upon it to rotate with the shaft, a spool upon which to wind the wire of a fence by revolving the shaft, whereby the vehicle is caused to move; and it consists, further, in means for controlling the paying out of wire from the spool in stringing the wire to form fences.

My invention also consists in the general construction of my improved device, whereby the desired objects are accomplished; and it still further consists in the various details of the construction and combinations of the parts forming the same shown in the accompanying drawings, in which—

Figure 1 is a plan view of my improved device; Fig. 2, a sectional view taken through the shaft on the line 2 2 of Fig. 1, viewed in the direction of the arrows, and showing a dog mechanism provided upon the shaft of the device; Fig. 3, a sectional view taken through the shaft on the line 3 3 of Fig. 1, viewed in the direction of the arrows, and showing a brake provided upon the shaft of the device; Fig. 4, a sectional view showing a detail, and Fig. 5 a perspective view of a movable clamp secured upon the shaft of the device.

A is the body of a vehicle, provided with wheels B, and having standards C and C' to afford bearings for the axle of the reel mechanism hereinafter described. The cart A is provided at one end with extensions $t$, carrying a handle, $r$, loosely journaled within the ends of the extensions $t$. The purpose and office of this rotatory handle are hereinafter explained.

D is a shaft, forming the axle of the reel, supported upon bearings provided in the upper extremities of the supports C and C', and having at one end a crank, $q$, with a handle, $q'$. Toward one extremity the shaft D is screw-threaded, as shown at $p'$, to afford longitudinal motion on the shaft to a screw-threaded clamp or nut, $p$, thereby to press a wooden spool, E, adjusted upon the shaft, (the original spools on which wire is wound for transportation and sold, or of a like nature, are preferred,) against the pointed projections $o'$, Fig. 5, of an adjustable clamp, $o$, toward the opposite extremity of the shaft D. Since the spools on which wire is wound by the manufacturers are of different sizes and of varying lengths, the clamp $o$ is made adjustable upon the shaft D to accommodate the device to any diversity in the length of such spools, and is provided with a set-screw, $o^2$, to secure the clamp firmly in its adjusted position. A lever of the second class, $n$, is pivoted at one extremity to a bracket, $n'$, upon the vertical support C′, and constructed to bear against the shaft D, toward one extremity of the latter, outside the adjustable clamp $o$. One end of a rope or chain, $m$, is hooked upon the longer arm $n^2$ of the lever $n$, and passed downward under a pulley, $l$, upon the body of the cart A, and thence outward to the rotatory handle $r$, hereinbefore described, upon which it is secured at its opposite end. The lever $n$, by its engagement with the shaft D, carrying the spool E, thus forms a brake to control the speed of the latter whenever in the judgment of the operator this is necessary by simply turning the handle $r$, thus tightening the rope or chain $m$, and drawing downward the extremity $n^2$ of the lever $n$. As it sometimes happens that the operator is obliged to abandon the handle of the device for a short time during the operation of reeling, a dog mechanism is provided upon the shaft D, to prevent uncoiling of wire when the device is left unattended. This dog mechanism consists of a ratchet, $k$, upon the shaft D, near the vertical support C′, and a dog, $k'$, upon the vertical support C′, pivoted above the ratchet to engage with its teeth on either side, and thus prevent the revolution of the reel either in one direction or the other, as may be desired.

The operation of my device is as follows: The shaft D having been removed from its bearings within the vertical supports C and C′, and the clamp or nut $p$ unscrewed, a spool, E, is placed upon the shaft, and the clamp $p$ adjusted, thus firmly pressing the spool against the points $o'$ on the adjustable clamp $o$, and rigidly securing the spool to revolve with the shaft. The shaft and spool are then replaced upon the vertical supports C and C′, the dog mechanism adjusted, and the device is ready, by simply turning the handle $q$ to wind the wire. In this operation it is only necessary to guide the cart with one hand placed upon an extension, $t$, since winding of wire upon the spool will cause the cart to move as fast as required.

When my device is used as a wire-fence builder, the operation is almost a contrary one. In this case a spool of wire is placed upon the shaft D and clamped, as before, and then to avoid the labor of lifting so heavy a weight the cart is turned over backward, the axle D inserted within the vertical supports C and C′, and the cart raised to its normal position. The free end of the wire upon the spool E is then fastened to the first post, and the cart drawn along, unreeling wire as rapidly as may be desired, perfect control being had over the paying out of the wire by means of the handle $r$, which acts through the rope or chain $m$ and lever $n$, to brake the shaft.

My device is not of necessity confined in its application to a two-wheeled cart, since any vehicle provided with upright supports and having more than two wheels might be used; but by reason of its greater convenience and the ease with which it may be turned over backward to permit the insertion of the shaft with the adjusted spool within the vertical supports, the two wheeled form is preferred.

I am aware of a device for winding fence-wire which bears a resemblance to my device for the same purpose, inasmuch as it comprises a vehicle in the form of a wheelbarrow, having mounted upon it independent of the wheel a detachable rotary shaft carrying a spool. The very nature of the vehicle, however, upon which the rotary shaft is mounted precludes movement thereof by mere rotation of the shaft in gathering the wire, the latter operation being evidently intended to be performed by two operators—one to propel the wheelbarrow and the other to turn the crank, and thereby rotate the shaft carrying the spool.

I do not claim the device referred to, nor intend that it shall be included within the terms of my claims, as the vital feature of my invention, so far as it relates to the gathering of fence-wire, consists in the capability of its being actuated by a single operator to rotate the spool-carrying shaft, and incidently propel the vehicle.

What I claim as new, and desire to secure by Letters Patent, is—

1. A device for gathering the wire of wire fences, comprising a vehicle provided with two or more wheels and having mounted upon it independent of the wheels and in suitable bearings a rotary shaft operated by a crank, and a spool detachably secured upon the shaft to revolve with it, whereby rotation of the said shaft in reeling the wire moves the vehicle, substantially as described.

2. A device for stringing fence-wire, comprising, in combination, a rotary shaft carrying a spool and mounted upon a wheeled vehicle, a rotary handle, $r$, upon the vehicle, and brake mechanism, substantially as described, upon the shaft and connected with the handle $r$, to permit, by the oscillation of the handle $r$, the speed of rotation of the shaft to be controlled, all substantially as described.

3. A device for stringing fence-wire, comprising, in combination, a rotary shaft, D, carrying a spool, E, and mounted upon vertical supports C and C' upon a wheeled vehicle, a rotatory handle, r, journaled upon extensions t on the vehicle, a lever, n, pivoted to the vertical support C', and constructed to bear against the rotary shaft D, a pulley, l, and a rope or chain, m, passing over the pulley and fastened at one end to the extremity of the lever n and at the other end to the rotatory handle r, as and for the purpose set forth.

4. In a device for gathering and stringing fence-wire, a shaft, D, to be mounted in bearings upon a wheeled vehicle and carry a spool, E, provided toward one end with an adjustable clamp, o, having projections o', and screw-threaded toward its opposite end, and provided with a nut, p, a rotatory handle, r, mounted upon projections t upon the vehicle, and brake mechanism, substantially as described, upon the shaft and connected with the handle r, to permit, by the oscillation of the handle r, the speed of the rotation of the shaft to be controlled, substantially as described, and for the purpose set forth.

5. A device for gathering and stringing fence-wire, comprising, in combination, a rotary shaft, D, carrying a spool, E, and mounted upon vertical supports C and C' upon a wheeled vehicle, and provided toward one end with an adjustable clamp, o, having projections o', and screw-threaded toward its opposite end, and provided with a nut, p, a ratchet, k, upon the shaft D, a dog, k', upon the vertical support C', a rotatory handle, r, journaled within extensions t upon the vehicle, a lever, n, pivoted to the vertical support C', and constructed to bear against the shaft D, and means, substantially as described, for connecting the lever n with the rotatory handle r, to permit, by the oscillation of the handle r, the speed of rotation of the shaft to be controlled, all substantially as described, and for the purpose set forth.

WALTER S. NEWTH.

In presence of—
 ROBERT H. ROBERTS,
 CLARA P. NEWTH.